United States Patent [19]

Yamaguchi et al.

[11] Patent Number: 4,757,726
[45] Date of Patent: Jul. 19, 1988

[54] VEHICLE GEAR TRANSMISSION HAVING AN OVERDRIVE GEAR STAGE

[75] Inventors: Touhei Yamaguchi; Kazuhiko Moriyama; Ethuo Shirai, all of Hiroshima, Japan

[73] Assignee: Mazda Motor Corporation, Hiroshima, Japan

[21] Appl. No.: 897,507

[22] Filed: Aug. 18, 1986

[30] Foreign Application Priority Data

Aug. 19, 1985 [JP] Japan ................... 60-182387
Aug. 31, 1985 [JP] Japan ................... 60-192329
Sep. 9, 1985 [JP] Japan ................... 60-138315[U]

[51] Int. Cl.[4] ............... B60K 20/00; B60K 20/02; F16H 3/08
[52] U.S. Cl. ...................... 74/473 R; 74/359
[58] Field of Search ............... 74/473 R, 359, 360, 74/473 P, 522, 571 M

[56] References Cited

U.S. PATENT DOCUMENTS

| | | | |
|---|---|---|---|
| 2,186,536 | 1/1940 | Maier | 74/359 X |
| 2,356,522 | 8/1944 | Kummich | 74/359 |
| 4,275,612 | 6/1981 | Silvester | 74/473 R |
| 4,282,775 | 8/1981 | Van Dest | 74/360 X |
| 4,324,152 | 4/1982 | Oshima et al. | 74/473 R X |
| 4,333,360 | 6/1982 | Simmons | 74/473 P |
| 4,337,675 | 7/1982 | Holdeman | 74/359 X |
| 4,432,251 | 2/1984 | Malott | 74/473 R X |
| 4,515,031 | 5/1985 | Janson | 74/359 |
| 4,539,859 | 9/1985 | Arai et al. | 74/473 R X |
| 4,614,129 | 9/1986 | Skog | 74/473 R X |
| 4,616,578 | 10/1986 | Musser | 74/571 M X |

FOREIGN PATENT DOCUMENTS

| | | | |
|---|---|---|---|
| 2527052 | 12/1976 | Fed. Rep. of Germany | 74/473 R |
| 2804697 | 8/1978 | Fed. Rep. of Germany | 74/473 R |
| 0137747 | 8/1982 | Japan | 74/359 |
| 58-142727 | 9/1983 | Japan | . |
| 0180321 | 10/1983 | Japan | 74/473 R |
| 60-44640 | 3/1985 | Japan | . |
| 1053353 | 12/1966 | United Kingdom | 74/473 R |

*Primary Examiner*—Dirk Wright
*Attorney, Agent, or Firm*—Fleit, Jacobson, Cohn & Price

[57] ABSTRACT

A vehicle gear transmission having an overdrive and reverse gear stages. The counter-overdrive gear and the counter-reverse gear on the countershaft are rotatably mounted on the countershaft and a synchronizing mechanism is provided between the counter-overdrive gear and the counter-reverse gear. The clutch hub sleeve of the synchronizing mechanism is actuated by a manual shift lever through a reversing lever which functions to reverse the direction of movement of the shift lever before the movement is transmitted to the clutch hub sleeve.

17 Claims, 6 Drawing Sheets

VEHICLE GEAR TRANSMISSION HAVING AN OVERDRIVE GEAR STAGE

BACKGROUND OF THE INVENTION

1. Field of the Invention

The present invention relates to a vehicle gear transmission, and more particularly to a vehicle gear transmission having an overdrive gear stage.

2. Description of the Prior Art

A manually operated gear transmission for motor vehicles generally includes a countershaft adapted to be driven by an engine drive shaft and an output shaft which is located in parallel with the countershaft and adapted to be connected with vehicle driven shaft usually through a differential gear mechanism. Between the countershaft and the output shaft, there are provided a plurality sets of intermeshing gears of different gear ratios, one of the gear sets being selected to complete a power transmitting gear train of a desired gear ratio.

In conventional structures, so-called counter gears provided on the countershaft are mounted on the countershaft through splines so that they rotate together with the countershaft. The driven gears on the output shaft are rotatable with respect to the output shaft and mechanisms are provided for selectively connecting one of the gears to the output shaft. In connecting one of the gears to the output shaft, there usually is a difference in rotating speed between the output shaft and the one gear on the output shaft so that a synchronizing mechanism is provided for each gear on the output shaft. Usually, such synchronizing mechanism is provided between two adjacent gears on the output shaft so that one such mechanism can be used in common for the two gears at the opposite sides of the synchronizing mechanism. For example, in a gear transmission having an overdrive gear stage, a first synchronizer is provided between the first and second stage driven gears, a second synchronizer is provided between the third and fourth stage driven gears, and a third synchronizer is provided between the overdrive driven gear and the reverse stage driven gear. The arrangement is believed as being effective in making the structure simple.

In a gear transmission having an overdrive gear stage, the gear on the countershaft for the overdrive gear stage is of a large diameter in order to provide a desired gear ratio. In case where such a counter-overdrive gear of a large diameter is provided to rotate with the countershaft, there will be a substantial increase in the inertia of the countershaft. This will cause inconveniencies in gear shifting operations in that the rotating speed of the counter-overdrive gear has to be synchronized with that of the output shaft overcoming the inertia of the countershaft. Thus, the shifting operations are made difficult and the synchronizing mechanism is subjected to an excessive load.

In order to eliminate the problems, there is proposed, by Japanese patent application No. 58-152948 which has been filed on Aug. 22, 1983 and disclosed for public inspection under the disclosure No. 60-44640, to mount the counter-overdrive gear rotatably on the countershaft and instead to connect the overdrive gear with the output shaft to rotate therewith. The arrangement is considered as being advantageous in that the inertia of the countershaft can be decreased.

It should however be noted that the arrangement as proposed by the aforementioned Japanese patent application is disadvantageous in that an additional synchronizer has to be provided between the countershaft and the counter-overdrive gear on the countershaft. In order to make it possible to actuate the synchronizer between the countershaft and the counter-overdrive gear, the shift rod for the overdrive gear stage and the reverse gear stage has to be provided with a shift fork for actuating the synchronizer for the overdrive gear stage as well as a shift fork for actuating the synchronizer for the reverse gear stage. Thus, a complicated mechanism is required. It should further be noted that in a conventional arrangement, the shift rod is located above the gear mechanism whereas the countershaft is in a lower portion of the gear mechanism so that a shift fork of a substantial length has to be provided in order to actuate the synchronizer on the countershaft. This will cause a further problem because there is a possibility that the rigidity of the shift fork is decreased to an undesirable extent. In order to increase the rigidity of the shift fork, the size of the shift fork is undesirably increased.

SUMMARY OF THE INVENTION

It is therefore an object of the present invention to provide a vehicle gear transmission having an overdrive gear stage but the inertia of the countershaft is not undesirably increased.

Another object of the present invention is to provide a vehicle gear transmission having an overdrive gear stage in which the counter-overdrive gear is rotatable on the countershaft but a synchronizer is commonly used for the overdrive gear stage and for the reverse gear stage.

Still further object of the present invention is to provide a novel gear shifting mechanism for a vehicle gear transmission.

According to the present invention, the above and other objects can be accomplished by a vehicle gear transmission including a countershaft adapted to be driven by an engine drive shaft, a plurality of first gears provided on said countershaft, an output shaft carrying a plurality of second gears which are paired and in meshing engagement with respective ones of the first gears, one of the gears in each pair being mounted on one of the countershaft and the output shaft to which said one gear is associated for rotation with said one shaft, the other of the gear in the pair being mounted on the other shaft for free rotation, connecting means for connecting said other gear with said other shaft, shifting means for selectively actuating said connecting means so that selected one of said other gears is connected with said other shaft to establish a power transmitting gear train of a desired gear ratio, said pairs of gears including gears for an overdrive gear stage and for a reverse gear stage, the first gears for the overdrive and reverse gear stages being adjacent to each other and freely rotatable on the countershaft, said connecting means being provided in common between said first gears for the overdrive and reverse gear stages for alternately connecting said first gears for the overdrive and reverse gear stages to said countershaft, shifting means including shifting rod means and reversing lever means for reversing direction of movement of the shifting rod means and transmitting the movement of the shifting rod means to the connecting means to actuate the connecting means. The connecting means may include synchronizing means for synchronizing rotation of said other gear with rotation of said other shaft.

According to features of the present invention, the counter-overdrive gear on the countershaft is rotatable so that the inertia of the countershaft can be decreased to a desirable extent. Further, since the counter-reverse gear is also rotatable on the countershaft, it is possible to provide a connecting means in common between the counter-overdrive gear and the counter-reverse gear. Thus, the shifting mechanism can be simplified. In the arrangement of the present invention, the connecting means on the countershaft is located away from the shifting rod means, however, since the movement of the shifting rod means is transmitted through the reverse rod means to the connecting means, it is possible to ensure a positive shifting operation.

DESCRIPTION OF THE PREFERRED EMBODIMENTS

Figure 1:
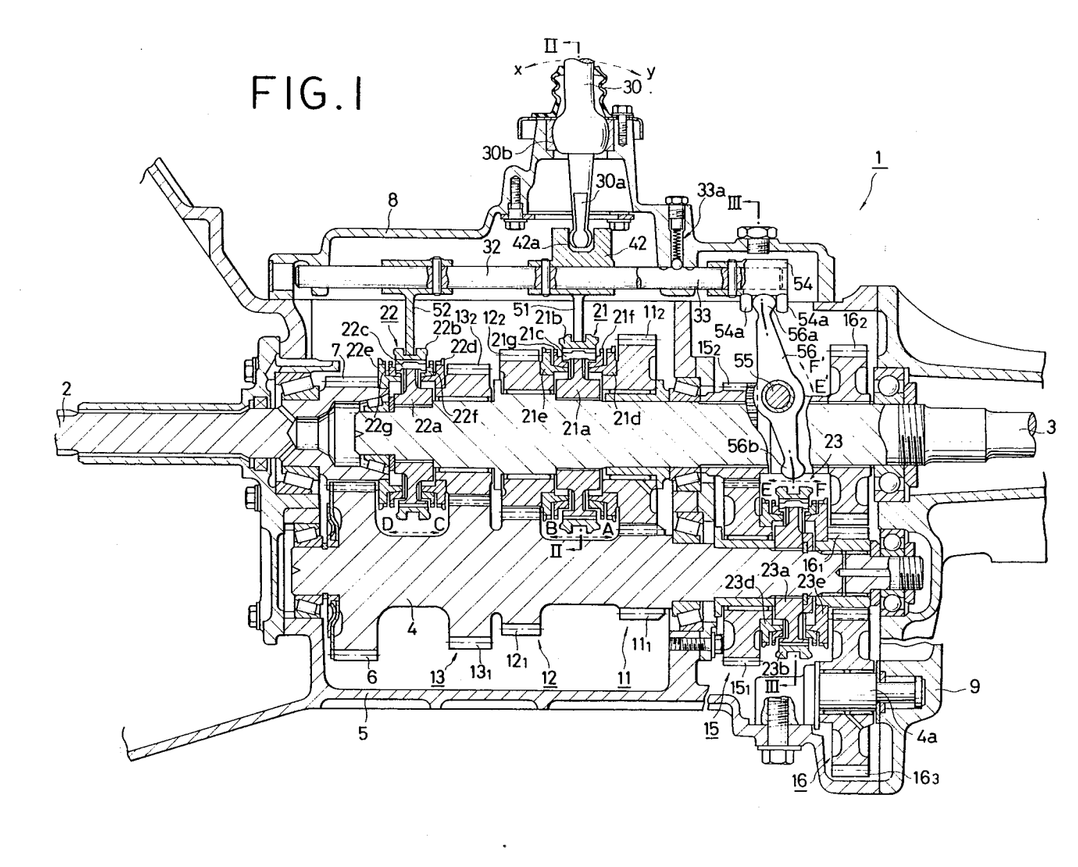
FIG. 1 is a longitudinal sectional view of a vehicle gear transmission in accordance with one embodiment of the present invention.

Referring to the drawings, particularly to FIG. 1, there is shown a vehicle gear transmission 1 which includes an input shaft 2 adapted to be driven by an engine drive shaft (not shown) and an output shaft 3 coaxially aligned with respect to the input shaft 2. A countershaft 4 is provided beneath the output shaft 3 in parallel with the output shaft 3. These shafts 2, 3 and 4 are arranged in a transmission casing 5 for rotation about their own axes.

The countershaft 4 is provided at one end with an input gear 6 which is in meshing engagement with a drive gear 7 provided on the input shaft 2 so that the countershaft 4 is driven by the input shaft 2 at a predetermined gear ratio. The countershaft 4 is provided adjacent to the input gear 6 with a counter-third gear $13_1$ for a third stage. The counter-third gear $13_1$ is rotatable together with the shaft 4 and in meshing engagement with an output third gear $13_2$ which is provided for free rotation on the output shaft 3. The gears $13_1$ and $13_2$, respectively; provide a third gear stage 13 for the transmission. Adjacent to the counter-third gear $13_1$, the countershaft 4 is provided with a counter-second gear $12_1$ which is rotatable together with the countershaft 4 and in meshing engagement with a driven second gear $12_2$ provided for free rotation on the input shaft 3 to provide a second gear stage 12 of the transmission. Similarly, a first gear stage 11 is provided by a counter-first gear $11_1$ which is provided on the countershaft 4 to rotate therewith and engaged with a driven first gear $11_2$ freely rotatable on the input shaft 3.

Between the driven first gear $11_2$ the driven second gear $12_2$, there is provided a synchronizing mechanism 21 for alternately connecting the gears $11_2$ and $12_2$, respectively; with the output shaft 3. The synchronizing mechanism 21 includes a clutch hub 21a which is splined to the output shaft 3 and a clutch hub sleeve 21b which is splined to the outer surface of the clutch hub 21a for axial sliding movements with respect thereto. A synchronizer key is provided between the synchronizer hub 21a and the sleeve 21b. At the opposite sides of the hub 21a, the gears $11_2$ and $12_2$, respectively are provided respectively with gear splines 21d and 21e which have tapered cones respectively engaged with synchronizer rings 21f and 21g. In this mechanism, when the clutch hub sleeve 21b is slidably moved in the direction shown by an arrow A, the sleeve 21b is at first engaged with the spline formed on the outer surface of the synchronizer ring 21f and the ring 21f is then forced through the synchronizer key 21c toward the tapered cone on the gear spline 21d so that the rotation of the clutch hub 21a is synchronized with the rotation of the gear spline 21d. As the sleeve 21b is engaged further deep with the gear spline 21d, the driven first gear $11_2$ is engaged through the gear spline 21d, the sleeve 21b and clutch hub 21a with the output shaft 3. Similarly, when the clutch hub sleeve 21b is slidably moved in the direction shown by an arrow B, the driven second gear $12_b$ is engaged with the output shaft 3 through the gear spline 21e, the sleeve 21b and the clutch hub 21a. The synchronizing mechanism 21 is well known in the art so that detailed description will be omitted.

A similar synchronizing mechanism 22 is provided between the input shaft 2 and the counter-third gear $13_2$. The mechanism 22 includes a clutch hub 22a splined to the output shaft 3, a sleeve 22b provided on the outer surface of the clutch hub 22a, a synchronizer key 22c between the hub 22a and the sleeve 22b, gear splines 22d and 22e provided at the opposite sides of the clutch hub 22a, and synchronizer rings 22f and 22g. As the sleeve 22b is slidably moved in the direction shown by an arrow C in FIG. 1, the driven third gear $13_2$ is connected with the output shaft 3 to establish the third gear stage 13. When the sleeve 22b is in turn moved in the direction shown by an arrow D, the output shaft 3 is connected with the input shaft 2 to establish a fourth gear stage or a direct connection.

The transmission 1 shown in FIG. 1 includes a fifth or overdrive gear stage 15 and a reverse gear stage 16. The fifth gear stage 15 includes a counter-overdrive gear $15_1$ mounted on the countershaft 4 for free rotation with respect thereto and a driven fifth gear $15_2$ provided on the output shaft 3 to rotate therewith. The driven fifth gear $15_2$ is in meshing engagement with the counter-overdrive gear $15_1$. For providing the reverse gear stage 16, there is an idler shaft 4a which is supported on an extension housing 9 provided integrally with the transmission casing 5. A counter-reverse gear $16_1$ is mounted on the countershaft 4 for free rotation with respect thereto. A driven reverse gear $16_2$ is provide on the output shaft 3 to rotate together with the output shaft 3. The counter-reverse gear $16_1$ on the countershaft 4 is in engagement with an idler gear $16_3$ which is in turn engaged with the driven reverse gear $16_2$ on the output shaft 3.

There is provided a synchronizing mechanism 23 between the counter-overdrive gear $15_1$ and the counter-reverse gear $16_1$. The synchronizing mechanism 23 is identical in structure to the synchronizing mechanism 21 so that detailed descriptions will be omitted but reference characters are given only to the synchronizing hub 23a, the sleeve 23b and the gear splines 23d and 23e. It will be noted that when the clutch hub sleeve 23b is slidably moved in the direction shown by an arrow E, the counter-overdrive gear $15_1$ is connected with the countershaft 4. When the sleeve 23b is slidably moved in the direction shown by an arrow F, the counter-reverse gear 16₁ is connected with the countershaft 4.

Figure 2:
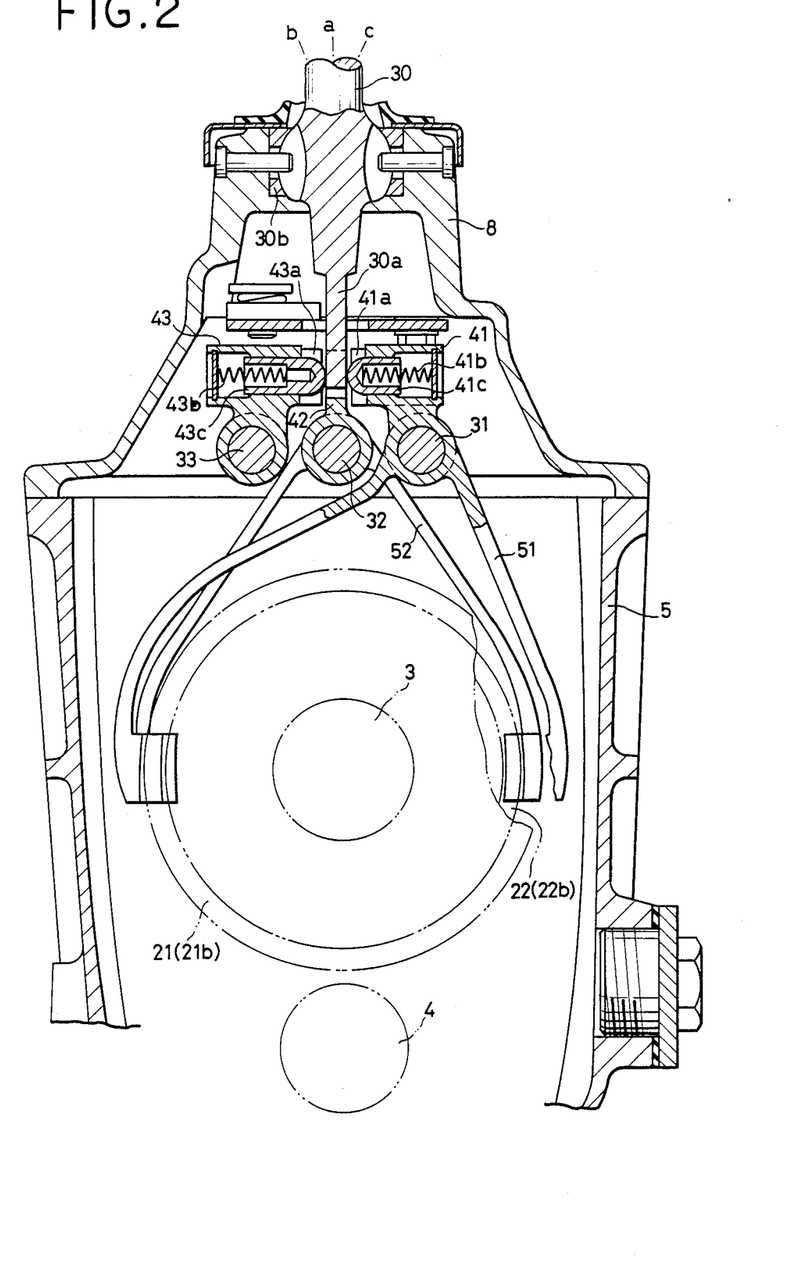
FIG. 2 is a sectional view taken substantially along the line II—II in FIG. 1.

In order to actuate the clutch hub sleeves 21b, 22b and 23b, there is provided a shift lever 30 and shift rods 31, 32 and 33. As shown in FIG. 2, a gear case cover 8 is attached to the upper portion of the transmission casing 5 and the shift rods 31, 32 and 33 are located in the space covered by the gear case cover 8 to extend parallel with the shafts 3 and 4. In FIG. 1, it will be noted that the central shift rod 32 is provided at a portion beneath the shift lever 30 with a block 42 which has an upwardly opened transversely extending groove 42a. The other rods 31 and 33 are provided adjacent to the block 42 whith blocks 41 and 43, respectively.

The shift lever 30 has a downwardly extending pawl 30a which is normally engaged with the groove 42a in the block 42 when the lever 30 is in the neutral position shown in FIG. 2. The shift lever 30 is mounted at a vertically intermediate portion on the case cover 8 by means of a spherical bearing 30b so that it can be moved from the position a to the positions b and c. As shown in FIG. 2, the block 41 has a laterally inwardly opened cutout 41a. Similarly, the block 43 has a laterally inwardly opened cutout 43a. Thus, it will be understood that the pawl 30a on the shift lever 30 is engaged with the cutout 41a in the block 41 when the lever 30 is moved to the position b and with the cutout 43a in the block 43 when the lever 30 is moved to the position c. In order to return the shift lever to the neutral position shown as the position a, the block 41 is provided with a return spring 41b which forces the pawl 30a of the shift lever 30 through a return pin 41c. Similarly, the block 43 is provided with a return spring 43b and a pin 43c.

In the structure described above, it will be understood that when the shift rod 30 is moved in the direction shown by an arrow x in FIG. 1 while it is held in the neutral position a, the shift rod 32 is moved toward right in FIG. 1. When the shift lever 30 is moved in the opposite direction as shown by an arrow y, the shift rod 32 is moved toward left in FIG. 1. When the shift lever 30 is moved in a similar manner while it is held in the positions b and c, the shift rods 31 and 33 are respectively actuated. In order to yieldably hold the rod 33 longitudinally in the position shown in FIG. 1, a ball detent device 33a is provided as shown in FIG. 1. A similar ball detent device is also provided for each of the rods 31 and 32. The block 41 is formed integrally with a shift fork 51 which is engaged with the clutch hub sleeve 21b of the synchronizing mechanism 21. The block 42 is integrally formed with a shift fork 52 which is engaged with the clutch hub sleeve 22b in the synchronizing mechanism 22.

Figure 3:
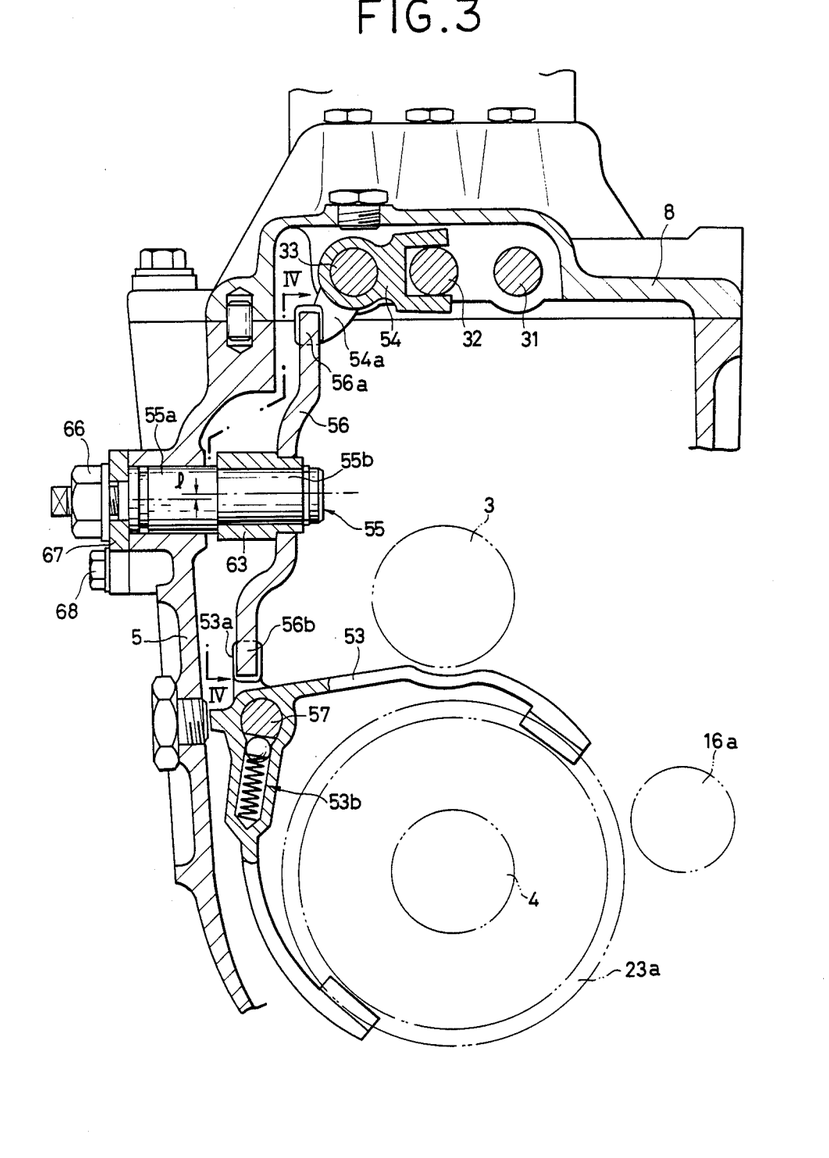
FIG. 3 is a sectional view taken substantially along the line III—III in FIG. 1.

As shown in FIGS. 1 and 3, the shift rod 33 has a shift block 54 which is secured thereto at an end portion. A reversing or swingable lever 56 is provided and supported at a side wall of the transmission casing 5 by means of a pin 55. The shift block 54 has a lug 54a which is engaged with an upper end portion 56a of the lever 56 so that the lever 56 is swingably moved about the pin 55 as the shift rod 33 is moved in its axial direction. A shift fork 53 is supported for slidably movement by a shaft 57 and has a lug portion 53a which is engaged with a lower end portion 56b of the lever 56. It will therefore be understood that the movement of the shift rod 33 is transmitted through the shift block 54 and the reversing lever 56 to the shift fork 53 to move the shift fork in the direction opposite to the direction of movement of the shift rod 33. The shift fork 53 is engaged with the clutch hub sleeve 23b of the synchronizing mechanism 23 so that the clutch hub sleeve 23b is moved as the shift rod 33 is moved in the direction opposite to the direction of the movement of the shift rod 33. In order to retain the shift fork 53 in a neutral position, a ball detent device 53b is provided.

Figure 4:
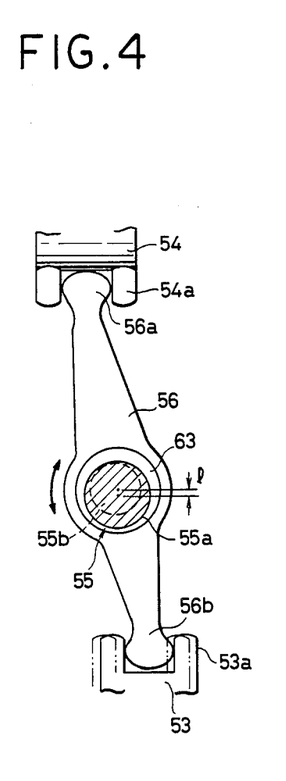
FIG. 4 is a sectional view taken substantially along the line IV—IV in FIG. 3.

The pin 55 is in the form of an eccentric shaft having a base cylindrical portion 55a and an eccentric portion 55b. The base portion 55a is mounted on the transmission casing 5 and the eccentric portion 55b supports the reversing lever 56 through a sleeve 63. The pin 55 is secured to the casing 5 by means of a nut 66. The eccentric portion 55b is radially offset from the base portion 55a by a distance 1 as shown in FIG. 3 so that it is possible to adjust the position of the shift fork 53 with respect to the shift block 54 by simply rotating the pin 55 as shown in FIG. 4.

Figure 5:
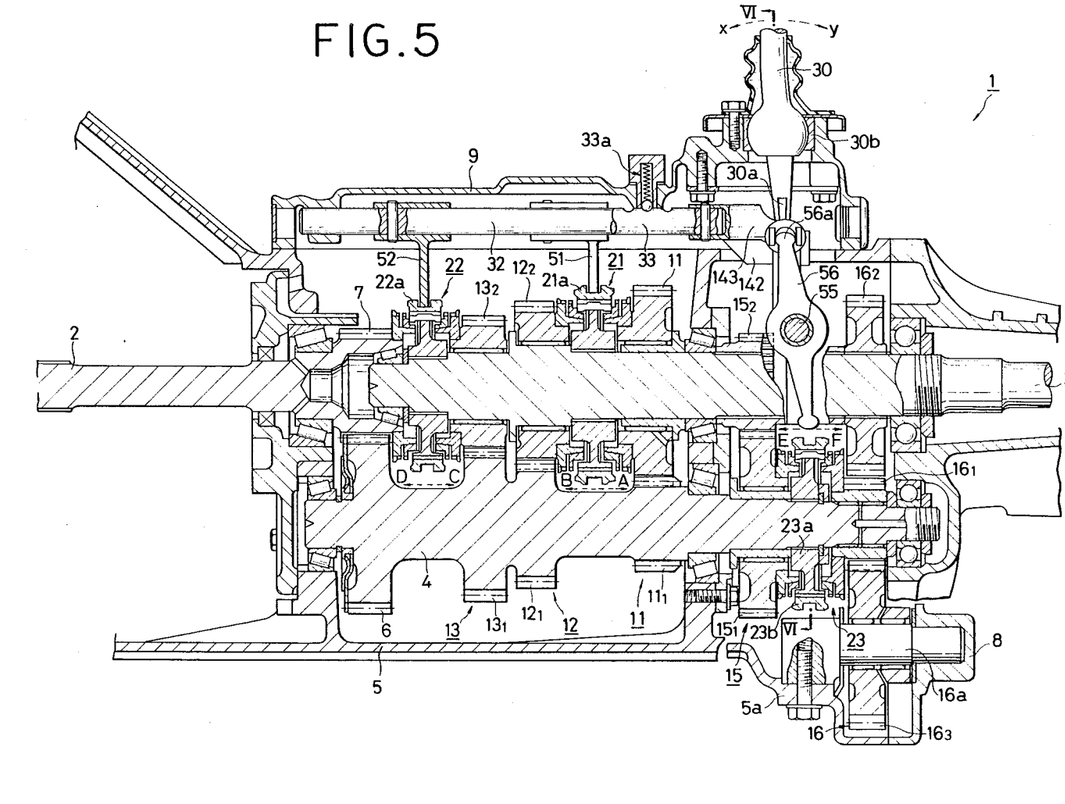
FIG. 5 is a sectional view similar to FIG. 1 but showing another embodiment; and, FIG. 6 is a sectional view taken substantially along the line VI—VI in FIG. 5.
Figure 6:
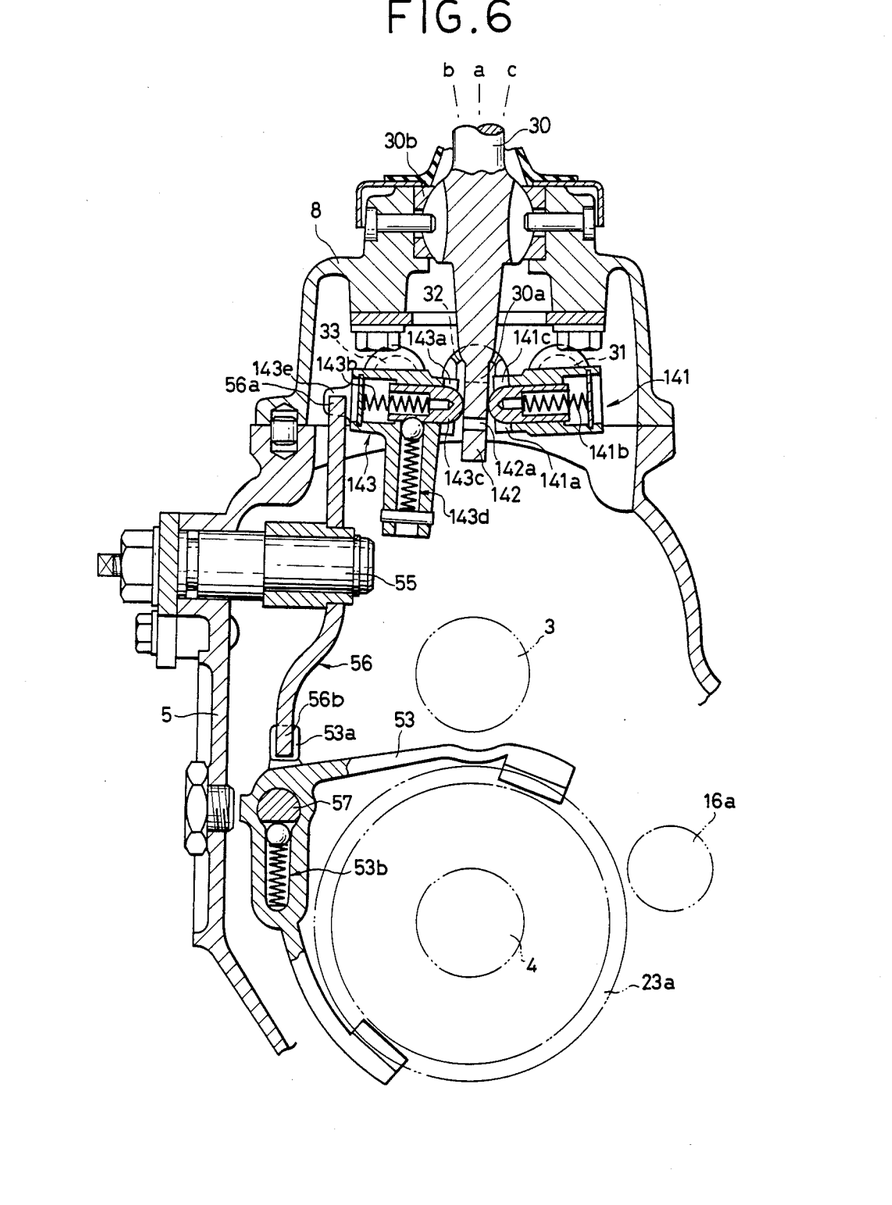

Referring now to FIGS. 5 and 6, the embodiment shown therein is different from the previous embodiment in that the central shift rod 32 has a shift block 142 which is similar to the block 42 in the previous embodiment but secured to the rod 32 at one end portion. Adjacent to the block 142, the shift rods 31 and 33 are provided respectively with shift blocks 141 and 143. The block 141 is similar in structure to the block 41 in the previous embodiment and has a sidewardly opened lug 141a, a return spring 141b and a return block 141c. The shift block 143 has a laterally inwardly opened lub 143a for engagement with the lower end portion 30a of the shift lever 30, and a return spring 143b and a return block 143c are provided as in the previous embodiment. The block 143 is further provided with a ball detent device 143d for retaining the shift lever in the neutral position a. At the laterally outer end, the block 143 is formed with a lug 143e which is engaged with the upper end 56a of the reversing lever 56. The operations of this embodiment are the same as in the previous embodiment so that detailed descriptions will not be made.

The invention has thus been shown and described with reference to preferable embodiments which are illustrated in the accompanying drawings, however, it should be noted that the invention is in no way limited to the details of the illustrated structures but changes and modifications may be made without departing from the scope of the appended claims.

We claim:

1. A vehicle gear transmission including a countershaft adapted to be driven by an engine drive shaft, a plurality of first gears provided on said countershaft, an output shaft carrying a plurality of second gears which are paired and in meshing engagement with respective ones of the first gears, one of the gears in each pair being mounted on one of the countershaft and the ouput shaft to which said one gear is associated for rotation with said one shaft, the other of the gears in the pair being mounted on the other shaft for free rotation, connecting means for connecting said other gear with said other shaft, shifting means for selectively actuating said connecting means so that selected one of said other gears is connected with said other shaft to establish a power transmitting gear train of a desired gear ratio, a transmission casing receiving said countershaft, output shaft, first gears and second gears, an extension housing provided on one end portion of the transmission casing at which said output shaft is located and extended therethrough, said pairs of gears including gears for an overdrive gear stage and for a reverse gear stage, the first gears for the overdrive and reverse gear stages being adjacent to each other and freely rotatable on the countershaft, the reverse gear stage being provided with an idler gear, said idler gear mounted on an idler shaft carried by the extension housing, the overdrive gear stage and the reverse gear stage being disposed close to the extension housing within the transmission casing, forward gear stages other than the overdrive and reverse gear stages being disposed within the transmission casing opposite the extension housing within the transmission casing, the forward gear stages being disposed in such an order that as the reduction ratio of a gear stage becomes large, the location of the gear stage becomes closer to the extension housing, said connecting means being provided in common between said first gears for the overdrive and reverse gear stages for alternately connecting said first gears for the overdrive and reverse gear stages to said countershaft, shifting means including shifting rod means and reversing lever means for reversing direction of movement of the shifting rod means and transmitting the movement of the shifting rod means to the connecting means to actuate the connecting means, said reversing lever means being adjustably supported by eccentric pin means.

2. A vehicle gear transmission in accordance with claim 1 in which said reversing lever means extends substantially vertically and has an upper end portion engaged with said shift rod means.

3. A vehicle gear transmission in accordance with claim 1 which includes three shift rods extending in parallel with said countershaft, one of said shift rods being engaged with said reversing lever means.

4. A vehicle gear transmission in accordance with claim 3 in which each of said shift rods is provided with shift block means having lug means for releasably engaging a manually operated shift lever.

5. A vehicle gear transmission in accordance with claim 4 in which said shift block means is provided at an intermediate portion of each shift rod.

6. A vehicle gear transmission in accordance with claim 4 in which one of said shift rods is provided at one end portion with second shift block means having lug means for engagement with said reversing lever means.

7. A vehicle gear transmission in accordance with claim 4 in which said three shift rods are arranged in a side-by-side relationship, return means being provided for normally engaging the shift lever with the shift block means in central one of the shift rods.

8. A vehicle gear transmission in accordance with claim 3 in which each shift rod is provided with retaining means for yieldably retaining the shift rod in one axial position.

9. A vehicle gear transmission in accordance with claim 1 in which said reversing lever means is engaged with said connecting means through shift fork means.

10. A vehicle gear transmission in accordance with claim 9 in which said shift fork means is slidably supported by a shaft which is parallel with said countershaft.

11. A vehicle gear transmission in accordance with claim 10 in which said shift fork means is provided with retaining means for yieldably retaining said shift fork means in a position.

12. A vehicle gear transmission in accordance with claim 11 in which a manually operated shift lever is provided directly above the connecting means for the overdrive and reverse gear stages.

13. A vehicle gear transmission in accordance with claim 12 in which said shift rod means is provided at one end with shift block means having first lug means for releasably engaging the shift lever and second lug means for engaging the reversing lever means.

14. A vehicle gear transmission including a countershaft adapted to be driven by an engine drive shaft, a plurality of first gears provided on said countershaft, an output shaft carrying a plurality of second gears which are paired and in meshing engagement with respective ones of the first gears, one of the gears in each pair being mounted on one of the countershaft and the ouput shaft to which said one gear is associated for rotation with said one shaft, the other of the gears in the pair being mounted on the other shaft for free rotation, connecting means for connecting said other gear with said other shaft, shifting means for selectively actuating said connecting means so that selected one of said other gears is connected with said other shaft to establish a power transmitting gear train of a desired gear ratio, said pairs of gears including gears for an overdrive gear stage and for a reverse gear stage, the first gears for the overdrive and reverse gear stages being adjacent to each other and freely rotatable on the countershaft, said connecting means being provided in common between said first gears for the overdrive and reverse gear stages for alternately connecting said first gears for the overdrive and reverse gear stages to said countershaft, shifting means including shifting rod means and reversing lever means for reversing direction of movement of the shifting rod means and transmitting the movement of the shifting rod means to the connecting means to actuate the connecting means, three shift rods extending in parallel with said countershaft, one of said shift rods being engaged with said reversing lever means, each of said shift rods being provided with shift block means having lug means for releasably engaging a manually operated shift lever, said three shift rods being arranged in a side-by-side relationship, return means being provided for normally engaging the shift lever with the shift block means in central one of the shift rods, and wherein said return means is provided for each of side shift rods and includes shoe means and return spring means for forcing said shoe means toward said shift lever to thereby urge the shift lever to a position wherein the shift lever engages the central one of the shift rods, one of the shoe means being provided with retaining means for retaining the shift rod in said position wherein the shift lever engages the central one of the shift rods.

15. A vehicle gear transmission including a countershaft adapted to be driven by an engine drive shaft, a plurality of first gears provided on said countershaft, an output shaft carrying a plurality of second gears which are paired and in meshing engagement with respective ones of the first gears, one of the gears in each pair being mounted on one of the countershaft and the output shaft to which said one gear is associated for rotation with said one shaft, the other of the gears in the pair being mounted on the other shaft for free rotation, connecting means for connecting said other gear with said other shaft, shifting means for selectively actuating said connecting means so that selected one of said other gears is connected with said other shaft to establish a power transmitting gear train of a desired gear ratio, a transmission casing receiving said countershaft, output shaft, first gears and second gears, an extension housing provided on one end portion of the transmission casing at which said output shaft is located and extended therethrough, said pairs of gears including gears for an overdrive gear stage and for a reverse gear stage, the first gears for the overdrive and reverse gear stages being adjacent to each other and freely rotatable on the countershaft, the reverse gear stage being provided with an idler gear, said idler gear mounted on an idler shaft carried by the extension housing, the overdrive gear stage and the reverse gear stage being disposed close to the extension housing within the transmission casing, forward gear stages other than the overdrive and reverse gear stages being disposed within the transmission casing opposite the extension housing within the transmission casing, the forward gear stages being disposed in such an order that as the reduction ratio of a gear stage becomes large, the location of the gear stage becomes closer to the extension housing, said connecting means being provided in common between said first gears for the overdrive and reverse gear stages for alternately connecting said first gears for the overdrive and reverse gear stages to said countershaft, shifting means including shifting rod means and reversing lever means for reversing direction of movement of the shifting rod means and transmitting the movement of the shifting rod means to the connecting means to actuate the connecting means, said idler shaft being carried at one end by the extension housing and at another end by a supporting member fixed by a bolt.

16. A vehicle gear transmission including a countershaft adapted to be driven by an engine drive shaft, a plurality of first gears provided on said countershaft, an output shaft carrying a plurality of second gears which are paired and in meshing engagement with respective ones of the first gears, one of the gears in each pair being mounted on one of the countershaft and the output shaft to which said one gear is associated for rotation with said one shaft, the other of the gears in the pair being mounted on the other shaft for free rotation, connecting means for connecting said other gear with said other shaft, shifting means for selectively actuating said connecting means so that selected one of said other gears is connected with said other shaft to establish a power transmitting gear train of a desired gear ratio, said pairs of gears including gears for an overdrive gear stage and for a reverse gear stage, the first gears for the overdrive and reverse gear stages being adjacent to each other and freely rotatable on the countershaft, said connecting means being provided in common between said first gears for the overdrive and reverse gear stages for alternately connecting said first gears for the overdrive and reverse gear stages to said countershaft, shifting means including shifting rod means and reversing lever means for reversing direction of movement of the shifting rod means and transmitting the movement of the shifting rod means to the connecting means to actuate the connecting means, said shifting rod means comprising three shift rods extending in parallel with said countershaft, one of said shift rods being engaged with said reversing lever means, the one of said shift rods being provided with a shift block which is secured to the one of said shift rods, and the shift block being formed with a pair of projections by which another of said shift rods adjacent to the one of said shift rods is clipped.

17. A vehicle gear transmission in accordance with claim 16 further including a transmission casing receiving said countershaft, output shaft, first gears and second gears, an extension housing provided on one end portion of the transmission casing at which said output shaft is located and extended therethrough, the reverse gear stage being disposed close to the extension housing compared with the overdrive gear stage, the reverse gear stage being provided with an idler gear, said idler gear mounted on an idler shaft carried by the extension housing, the overdrive gear stage and the reverse gear stage being disposed close to the extension housing within the transmission casing, forward gear stages other than the overdrive and reverse gear stages being disposed within the transmission casing opposite the extension housing within the transmission casing, the forward gear stages being disposed in such an order that as the reduction ratio of a gear stage becomes large, the location of the gear stage becomes closer to the extension housing.

* * * * *